(12) United States Patent
Jacobsen

(10) Patent No.: US 7,440,914 B2
(45) Date of Patent: Oct. 21, 2008

(54) METHOD AND APPARATUS FOR FULLY INSURING LARGE BANK DEPOSITS

(75) Inventor: Mark P. Jacobsen, Arlington, VA (US)

(73) Assignee: Promontory Interfinancial Networks, LLC, Arlington, VA (US)

( * ) Notice: Subject to any disclaimer, the term of this patent is extended or adjusted under 35 U.S.C. 154(b) by 1418 days.

(21) Appl. No.: 10/124,462

(22) Filed: Apr. 17, 2002

(65) Prior Publication Data

US 2003/0023529 A1    Jan. 30, 2003

Related U.S. Application Data

(60) Provisional application No. 60/307,815, filed on Jul. 27, 2001, provisional application No. 60/323,365, filed on Sep. 20, 2001.

(51) Int. Cl.
G06Q 40/00    (2006.01)

(52) U.S. Cl. ........................................... 705/35; 705/39

(58) Field of Classification Search ................ 364/408, 364/401; 705/35, 37, 39
See application file for complete search history.

(56) References Cited

U.S. PATENT DOCUMENTS

| | | | |
|---|---|---|---|
| 4,774,663 A | 9/1988 | Musmanno et al. | |
| 4,985,833 A * | 1/1991 | Oncken | 705/42 |
| 5,893,078 A | 4/1999 | Paulson | |
| 6,098,051 A | 8/2000 | Lupien et al. | |
| 6,131,810 A | 10/2000 | Weiss et al. | |
| 6,374,231 B1 * | 4/2002 | Bent et al. | 705/36 R |
| 7,249,095 B2 * | 7/2007 | Davies et al. | 705/39 |
| 2002/0010670 A1 * | 1/2002 | Mosler et al. | 705/37 |
| 2002/0091637 A1 | 7/2002 | Bent et al. | |
| 2002/0118221 A1 | 8/2002 | Hudson et al. | |
| 2002/0194107 A1 * | 12/2002 | Li et al. | 705/37 |
| 2003/0018554 A1 * | 1/2003 | Lyftogt et al. | 705/35 |
| 2005/0108149 A1 * | 5/2005 | Bent et al. | 705/38 |
| 2005/0228733 A1 * | 10/2005 | Bent et al. | 705/35 |
| 2006/0212385 A2 * | 9/2006 | Bent et al. | 705/38 |

(Continued)

FOREIGN PATENT DOCUMENTS

WO    WO 0169503 A1    9/2001

OTHER PUBLICATIONS

Patrick Parrish, Home Financial Calculator, May 1985, Compute! Issue 60, p. 29.*

*Primary Examiner*—James A Kramer
*Assistant Examiner*—Kevin Poe
(74) *Attorney, Agent, or Firm*—Panitch Schwarze Belisario & Nadel LLP

(57) ABSTRACT

An Interchange service that allows member banks participating in the service to offer their customers multiple certificates of deposit ("Multi-CDs") so that large deposits exceeding an applicable Federal deposit insurance limit (e.g., $100,000) are fully insured. The Interchange partitions each of the large deposits into a plurality of deposit portions that do not exceed the Federal deposit insurance limit. The deposit portions are assigned to the member banks so that, for each member bank, the difference between funds flowing out of and into each member bank is minimized or eliminated. Differences in deposit terms offered by each of the member banks are monetized and resolved through the calculation and payment of present value payments, which are transferred between member banks that have different sets of deposit terms.

28 Claims, 7 Drawing Sheets

U.S. PATENT DOCUMENTS

2006/0212389 A2 * 9/2006 Bent et al. .................... 705/40
2007/0271174 A2 * 11/2007 Bent et al. .................... 705/38
2008/0120228 A1 * 5/2008 Bent et al. .................... 705/39

* cited by examiner

| BANK A DEPOSIT TERMS FOR CUSTOMER A | | | | |
|---|---|---|---|---|
| INITIAL DEPOSIT | ANNUAL INTEREST RATE | CALCULATED INTEREST | PAYOUT | VALUE AT MATURITY |
| $100,000.00 | 3.000% | $3,000.00 | MONTHLY | $100,000.00 |

| BANK B DEPOSIT TERMS FOR CUSTOMER B | | | | |
|---|---|---|---|---|
| INITIAL DEPOSIT | ANNUAL INTEREST RATE | CALCULATED INTEREST | PAYOUT | VALUE AT MATURITY |
| $100,000.00 | 3.000% | $3,041.60 | AT MATURITY | $103,041.60 |

PAYMENT SCHEDULES

| | BANK A | | | BANK B | |
|---|---|---|---|---|---|
| MONTH | INTEREST PAYMENT PER PERIOD TO CUSTOMER B** | PRESENT VALUE OF INTEREST PAYMENTS | MONTH | INTEREST PAYMENT PER PERIOD TO CUSTOMER A** | PRESENT VALUE OF INTEREST PAYMENTS |
| 0 | 0.00 | 0.00 | 0 | 0.00 | 0.00 |
| 1 | 250.00 | 249.95 | 1 | 250.00 | 249.95 |
| 2 | 250.63 | 250.52 | 2 | 250.00 | 249.90 |
| 3 | 251.25 | 251.09 | 3 | 250.00 | 249.84 |
| 4 | 251.88 | 251.67 | 4 | 250.00 | 249.79 |
| 5 | 252.51 | 252.25 | 5 | 250.00 | 249.74 |
| 6 | 253.14 | 252.82 | 6 | 250.00 | 249.69 |
| 7 | 253.77 | 253.40 | 7 | 250.00 | 249.64 |
| 8 | 254.41 | 253.98 | 8 | 250.00 | 249.58 |
| 9 | 255.04 | 254.57 | 9 | 250.00 | 249.53 |
| 10 | 255.68 | 255.15 | 10 | 250.00 | 249.48 |
| 11 | 256.32 | 255.73 | 11 | 250.00 | 249.43 |
| 12 | 256.96 | 256.32 | 12 | 250.00 | 249.38 |
| PRESENT VALUE OF CASH FLOW | | $ 3,037.47 | PRESENT VALUE OF CASH FLOW | | $ 2,995.95 |

| DISCOUNT RATE | 3.000% | | PRESENT VALUE PAYMENT* | $ 41.52 |
|---|---|---|---|---|

*Fig. 3*

\* Difference in present value of cash flow paid to Customer B and present value of cash flow paid to Customer A. Payment from Bank B to Bank A.

\*\* In this example, through the matching process, Bank A assumes the responsibility of interest payments to Customer B and Bank B assumes the responsibility of interest payments to Customer A.

US 7,440,914 B2

METHOD AND APPARATUS FOR FULLY INSURING LARGE BANK DEPOSITS

CROSS-REFERENCE TO RELATED APPLICATIONS

This application claims the benefit of U.S. Provisional Application No. 60/307,815, filed Jul. 27, 2001, entitled "Method and Apparatus for Providing an Insured Return on a Bank Deposit," and U.S. Provisional Application No. 60/323,365, filed Sep. 20, 2001,entitled "Method and Apparatus for Allowing Individual Banks to Provide Government-Backed Insurance on Large Deposit Amounts," each of which is incorporated herein by reference in its entirety.

BACKGROUND OF THE INVENTION

In many banking systems throughout the world, bank deposits of individual depositors are insured by government-run deposit insurance programs up to an established deposit insurance limit. In the United States, for example, the current deposit insurance limit is generally $100,000 per individual account in any one bank. A similar insurance limit for credit union accounts is also in effect for deposits in United States credit unions.

Depositors wishing to have government-backed insured funds on large bank deposits in excess of the established insurance limit have limited options. A depositor can choose to open multiple accounts in separate banks, each account being maintained at an amount up to the established insurance limit. This process is time-consuming and administratively cumbersome. Alternatively, a depositor can place a large deposit in an amount that is a multiple of the established insurance limit in a banking company having a plurality of wholly owned subsidiary banks to which portions of the large bank deposit may be assigned. In the United States, such multi-account deposit services are currently offered by only a few financial institutions, such as Citigroup, Merrill Lynch and Fishback Financial Corporation. Thus, competition is limited and, for the vast majority of depositors, there is no opportunity to obtain such a service from a local community bank. Additionally, a depositor (or the bank at which the deposit is to be placed) can purchase deposit insurance from a private insurance company. But such insurance is expensive and raises concern as to whether the private insurance company is able to satisfy its obligations in the event of a banking system failure.

The growth of bank core deposits has failed to keep pace with loan and asset growth, particularly in community banks. As a result, banks have turned to alternative funding sources, such as Federal Home Loan Bank (FHLB) advances, wholesale funding and brokered deposits. These alternative funding sources are both more expensive and volatile than traditional core deposits, causing the net interest margins of the banks to be reduced and subjecting the banks to increased risk.

While the relative amount of insured bank deposits has declined, the demand for large denomination risk-free investment products has remained strong. However, recent Federal government budget surpluses have reduced the amount of outstanding U.S. Government bonds, notes and bills (collectively, Treasuries) available to investors. What is needed is a method and apparatus for processing large bank deposits to help banks attract new depositors looking to invest large amounts of funds in a fully insured credit risk-free investment vehicle.

BRIEF SUMMARY OF THE INVENTION

The present invention establishes a service that allows banks participating in the system to offer their customers multiple certificates of deposit, hereinafter referred to as "Multi-CDs."The banks are federally insured financial institutions that are approved to participate in an Interchange system that provides the Interchange service.

In a preferred embodiment of the present invention, large deposits that exceed an established deposit insurance limit are processed so that the large deposits are fully insured. The large deposits are received by a plurality of Unaffiliated Banks from their depositors. A processor receives orders placed by the plurality of Unaffiliated Banks to process the large deposits. The processor partitions each of the large deposits into a plurality of deposit portions. Each deposit portion does not exceed the established deposit insurance limit. The processor assigns at least some of the deposit portions to at least some of the Unaffiliated Banks. Each specific deposit portion is used to purchase a deposit instrument from the Unaffiliated Bank that the specific deposit portion was assigned to.

A first one of the Unaffiliated Banks may offer a first set of deposit terms to a first depositor and a second one of the Unaffiliated Banks may offer a second set of deposit terms to a second depositor. The processor may receive an order placed by the first Unaffiliated Bank to process a large deposit received from the first depositor. The processor may assign, to the second Unaffiliated Bank, a deposit portion associated with the large deposit received from the first depositor. The processor may calculate the amount of a present value payment to be transferred between the first and second Unaffiliated Banks to compensate for differences between the first and second sets of deposit terms.

The processor may calculate a first present value of cash flow based on the first set of deposit terms. The processor may calculate a second present value of cash flow based on the second set of deposit terms. The processor may calculate the difference between the first present value of cash flow and the second present value of cash flow to determine the amount of the present value payment.

The first and second present values of cash flow are determined based on:

(1) interest rates offered by the first and second Unaffiliated Banks;

(2) the amount of the deposit portion associated each large deposit;

(3) a number of times during a predetermined time period that interest earned on the deposit portion associated with the large deposit is to be compounded;

(4) a number of times that the predetermined time period is to occur;

(5) a payout frequency of the interest earned on the deposit portion; and (6) an established discount rate (e.g., the London Interbank Offering Rate (LIBOR)).

The amount of each specific deposit portion may be substantially equivalent to but not exceeding the established deposit insurance limit. The processor may direct the transfer of a payment to the depositor each time that interest earned on the associated deposit portion is compounded, so that the amount of the specific deposit portion does not exceed the established insurance limit.

For each specific Unaffiliated Bank, the processor may assign at least some of the deposit portions so as to minimize or eliminate the difference between the total amount of large deposits for which the specific Unaffiliated Bank placed orders into the processor and the total amount of deposit portions assigned to the specific Unaffiliated Bank by the processor.

If the total amount of deposit portions assigned to the specific Unaffiliated Bank is less than the total amount of large deposits for which the specific Unaffiliated Bank placed orders into the processor, the processor may:

(1) calculate an amount of funds to be deposited by a Lending Bank into the specific Unaffiliated Bank; and (2) direct the deposit of the funds from the Lending Bank to the specific Unaffiliated Bank so that the difference is minimized or eliminated.

The deposit instrument may be a certificate of deposit (CD). The CD may be a Municipal CD.

The processor may prioritize the orders to process the large deposits based on:

(1) the type of deposit instruments purchased by the customers from the Unaffiliated Banks;

(2) the size of each of the large deposits;

(3) the interest rate of the instruments offered by the Unaffiliated Banks;

(4) the geographical location of the Unaffiliated Banks;

(5) preferences indicated by customers associated with the large deposits;

(6) preferences indicated by the Unaffiliated Banks;

(7) the ability of the Unaffiliated Banks to offer a fully insured deposit instrument in return for a deposit made by a Lending Bank; and (8) the credit rating of the Unaffiliated Banks.

The established deposit insurance limit may be in accordance with U.S. law, regulations and rules established by the United States Federal Deposit Insurance Corporation (FDIC) or the National Credit Union Administration (NCUA).

If there are not enough Unaffiliated Banks for the processor to assign all of the deposit portions to in such a manner that ensures that they are all fully insured, the deposit portions may be assigned to at least one other bank that did not place an equivalent sized order (or any order) to process large deposits into the processor. The processor may partition the large deposits and assign the deposit portions on a periodic basis.

In another embodiment of the present invention, large deposits that exceed an established deposit insurance limit are processed so that the large deposits are fully insured. The large deposits are received by a plurality of banks from their depositors. A processor receives orders placed by the plurality of banks to process the large deposits. The processor partitions each of the large deposits into a plurality of deposit portions. Each deposit portion does not exceed the established deposit insurance limit. The processor assigns at least some of the deposit portions to at least some of the banks. Each specific deposit portion is used to purchase a deposit instrument from the bank that the specific deposit portion was assigned to. The processor receives an order placed by a first one of the banks that offers a first set of deposit terms to a depositor. The processor assigns, to a second one of the banks that offers a second set of deposit terms, a deposit portion associated with the large deposit received from the depositor. The processor calculates the amount of a present value payment to be transferred between the first and second banks to compensate for differences between the first and second sets of deposit terms.

In yet another embodiment of the present invention, a large deposit that exceeds an established deposit insurance limit is processed so that the large deposit is fully insured. The first large deposit is received from a depositor by a first one of a plurality of Unaffiliated Banks. A processor receives an order placed by the first Unaffiliated Bank to process the large deposit. The first Unaffiliated Bank offers a first set of deposit terms. The processor assigns, to a second one of the plurality of Unaffiliated Banks, a portion of the first large deposit that does not exceed the established deposit insurance limit. The second Unaffiliated Bank offers a second set of deposit terms. The processor assigns to one of the plurality of Unaffiliated Banks, a portion of the second large deposit that does not exceed the established deposit limit. The processor then calculates the amount of a present value payment to be transferred between the first Unaffiliated Bank and the second Unaffiliated Bank to compensate for differences between the first and second sets of deposit terms.

The processor may calculate a first present value of cash flow based on the first set of terms. The processor may calculate a second present value of cash flow based on the second set of terms. The processor may calculate the difference between the first present value of cash flow and the second present value of cash flow to determine the present value payment.

BRIEF DESCRIPTION OF THE SEVERAL VIEWS OF THE DRAWING

The following detailed description of preferred embodiments of the invention will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

In the drawings:

FIG. 3 shows an example of calculating a present value payment to compensate for differences in deposit terms offered by a plurality of different Unaffiliated Banks in accordance with the present invention;

DETAILED DESCRIPTION OF THE INVENTION

1. Definitions

Figure 1:
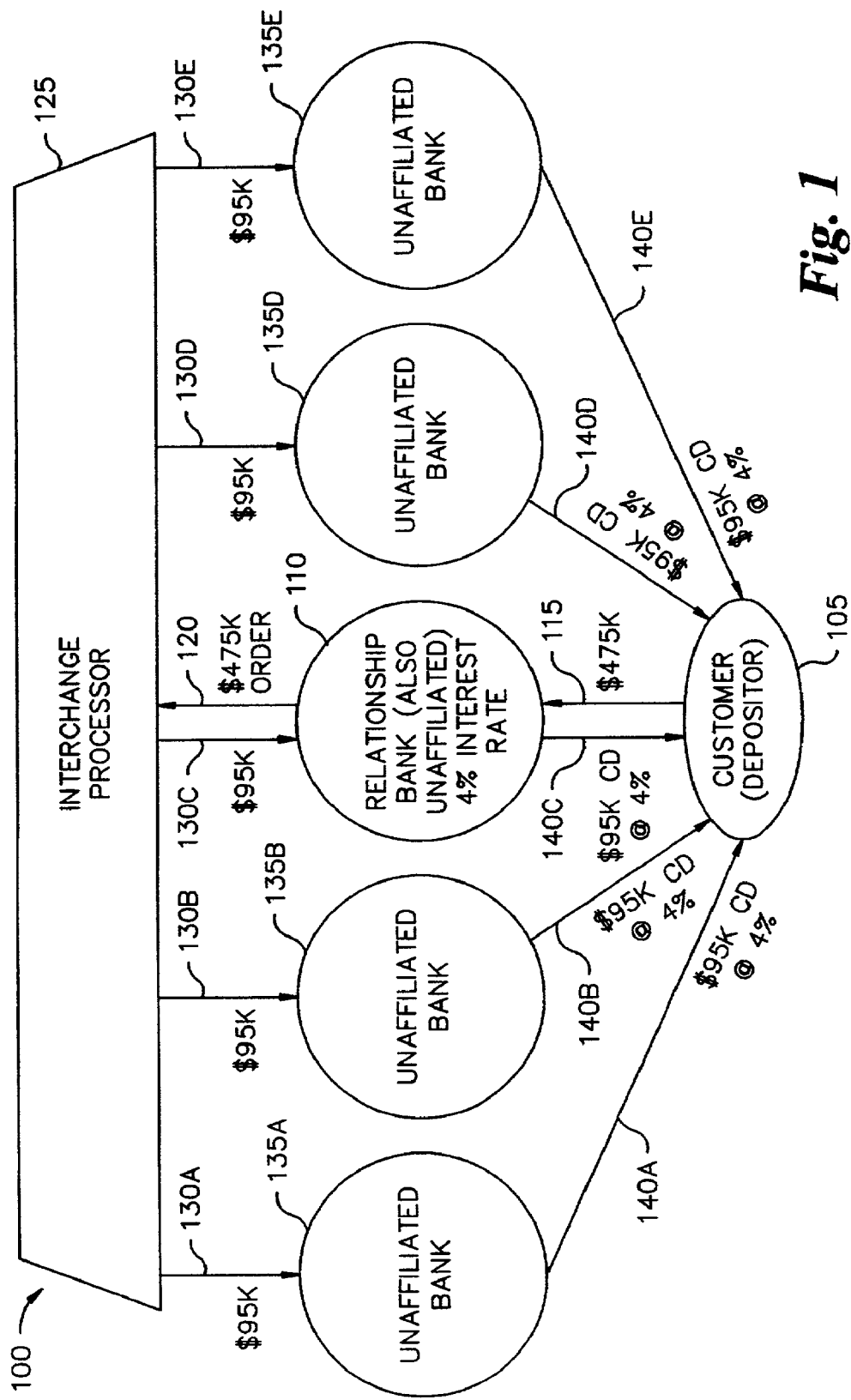
FIG. 1 is a block diagram of an Interchange system that processes large deposits in accordance with the present invention.

"Established deposit insurance limit" refers to the extent to which a government entity insures a deposit or deposits of one customer (depositor) in one bank. As an example, the established deposit insurance limit can be in accordance with U.S. law, regulations and rules established by the United States Federal Deposit Insurance Corporation (FDIC) or the National Credit Union Administration (NCUA).

"Bank" generally refers broadly to a financial institution that offers deposit products that are insured up to an established deposit insurance limit. The term "bank" can include, but is not limited to, banks, thrifts, credit unions, savings & loans, industrial loan companies and other depository institutions that can provide deposit products guaranteed by government-backed deposit insurance.

"Deposit" refers to funds received by a Relationship Bank from a customer.

"Deposit instrument" refers to a legal contract between a depositor and bank that promises to pay the depositor a particular rate of return for allowing the bank to hold and use funds received from the depositor. The term "deposit instrument" includes, but is not limited to, certificates of deposit (CDs).

"Interest Rate" is the annualized rate of return that a bank pays a customer in exchange for the customer's funds being held at the bank.

"Present Value of Cash Flow" or "PV of Cash Flow" refers to a series of payments discounted at an appropriate discount rate to compensate for the future value of the payments.

"Large deposit" refers to a deposit of an amount that exceeds an established deposit insurance limit.

"Lending Bank" refers to the bank (which may be one of many) that agrees to place additional deposits into an Interchange system at the request of the Interchange in order to resolve deposit mismatch situations.

"Deposit portion" or "tranche" refer to a portion of a large deposit, the amount of which does not exceed the established deposit insurance limit.

"Interchange" or "Interchange processor" is an interface that receives orders pertaining to large deposits that have been placed in banks that are members of the Interchange, and calculates a means to partition (divide) each large deposit into a plurality of deposit portions in accordance with one or more algorithms and sends instructions on where banks should send the deposits per the calculation.

"Relationship Bank" refers to a bank member of the Interchange that receives a large deposit from a depositor and places an order into the Interchange to process the large deposit.

"Unaffiliated Bank" refers to a bank member of the Interchange that is not owned by the same parent entity as other Unaffiliated Banks that share portions of a large deposit placed into the Interchange by a Relationship Bank. An Unaffiliated Bank issues deposit instruments to depositors of Relationship Banks. An Unaffiliated Bank can take the role of a Relationship Bank, and vice versa.

"Set of deposit terms" or "deposit terms" refers to a group of parameters used to determine the rate of return paid on a large deposit received by a Relationship bank and/or a portion of the large deposit received by an Unaffiliated Bank. The parameters may include the interest rate, frequency of interest payments, the length of a time period during which a specific rate of return is paid, frequency the interest is compounded, or the like.

"Order" is a request inputted by a representative of a Relationship Bank into the Interchange to process a large deposit received from a depositor so that portions of the large deposit are assigned to a plurality of Unaffiliated Banks.

"Deposit Mismatch" refers to an imbalance where an Unaffiliated Bank places orders into the Interchange to process large deposits received from depositors (when playing the role of a Relationship Bank) and does not receive an equivalent dollar amount of portions of large deposits back from the Interchange in return for the orders.

"Deposit Placement Failure" occurs when there are not enough other banks with which the Interchange can swap funds in order to ensure full insurance coverage of all deposits. This generally results from a bank placing with the Interchange either one very large denomination deposit or a very large number of individual deposits.

"Lending Bank" refers to a bank that can be called upon by the Interchange to provide additional deposits to address deposit mismatches.

"Matching date" is the date at which the Interchange initiates the process by which large deposits are partitioned and assigned to Unaffiliated Banks.

"Municipal CD" is a certificate of deposit purchased by a state or local governmental entity.

"Present value payment" or "PVP" is a payment transferred from one Unaffiliated Bank to another to equalize, for each of the Unaffiliated Banks, the value of large deposits inputted into the Interchange and the deposit portions received from the Interchange. Orders may be matched with other orders at the Interchange that have different interest rates and/or principal amounts. Unaffiliated Banks may need to make/receive a Present Value Payment to ensure that the amount each bank places in the Interchange is equivalent to the amount each bank receives (which thereby means that the total obligations of each bank to pay depositors a combination of principal and interest payments are equal for the particular transaction). The Present Value Payment is equal to the difference in the future cash flows (of both principal and interest payments) made by each bank, discounted back using the present value rate. The Present Value Payments are paid between banks on T+1.

"Interest plug" refers to a particular type of present value payment made to or received from an Unaffiliated Bank to compensate for differences among deposit terms offered by other member banks.

"LIBOR" (the London Interbank Offering Rate) is an international average of offered rates for dollar deposits based on quotes at eight major banks and is reported daily in The Wall Street Journal.

"ERate" refers to an interest rate that may be used in the determination of an interest plug amount. The ERate can be set to an established rate such as LIBOR.

"Preferred broker" is a broker dealer entity that facilitates or creates a secondary market for the purchase and sale of Multi-CDs.

"Service Bureau" is the component of the Interchange responsible for the maintenance of customer account records.

2. Detailed Description

FIG. 1 shows an example of the operation of an Interchange processor system 100 that allows a Relationship Bank 110 to fully insure a large deposit and accrued earnings of a bank customer 105. The large deposit exceeds an established deposit insurance limit, such as the $100,000 limit established by U.S. law and either the United States Federal Deposit Insurance Corporation (FDIC) or the National Credit Union Administration (NCUA). Customer 105 desires to place with Relationship Bank 110 (see path 115) a large deposit of $475,000 with a maturity of one year and an interest rate of 4.0%, which may be the advertised rate of Relationship Bank 110. Because the established deposit insurance limit is only $100,000, an order is inputted into an Interchange processor (hereafter "Interchange") 125 to process the large deposit. The Interchange 125 partitions the large deposit into a plurality of deposit portions (tranches) 130A, 130B, 130C, 130D, 130E of $95,000 each and assigns the deposit portions to Unaffiliated Banks 135A, 135B, 135D, 135E and Relationship Bank 110 (which is also an Unaffiliated Bank). Each of Unaffiliated Banks 135A, 135B, 135D, 135E and Relationship Bank 110 issue a certificate of deposit (CD) 140A, 140B, 140C, 140D, 140E to customer 105 in the amount of $95,000, at the deposit terms (e.g., the 4% interest rate) advertised by Relationship Bank 110. Because each deposit portion (e.g., CD) does not exceed the established deposit insurance limit of $100,000, the CDs are each fully insured and thus the large deposit is completely insured.

In an alternate embodiment, Relationship Bank 110 may retain a deposit portion of a large deposit when it is initially received, and issue a CD in that amount to customer 105. An order is then inputted into the Interchange 125 to process the remaining amount of the large deposit.

Figure 2:
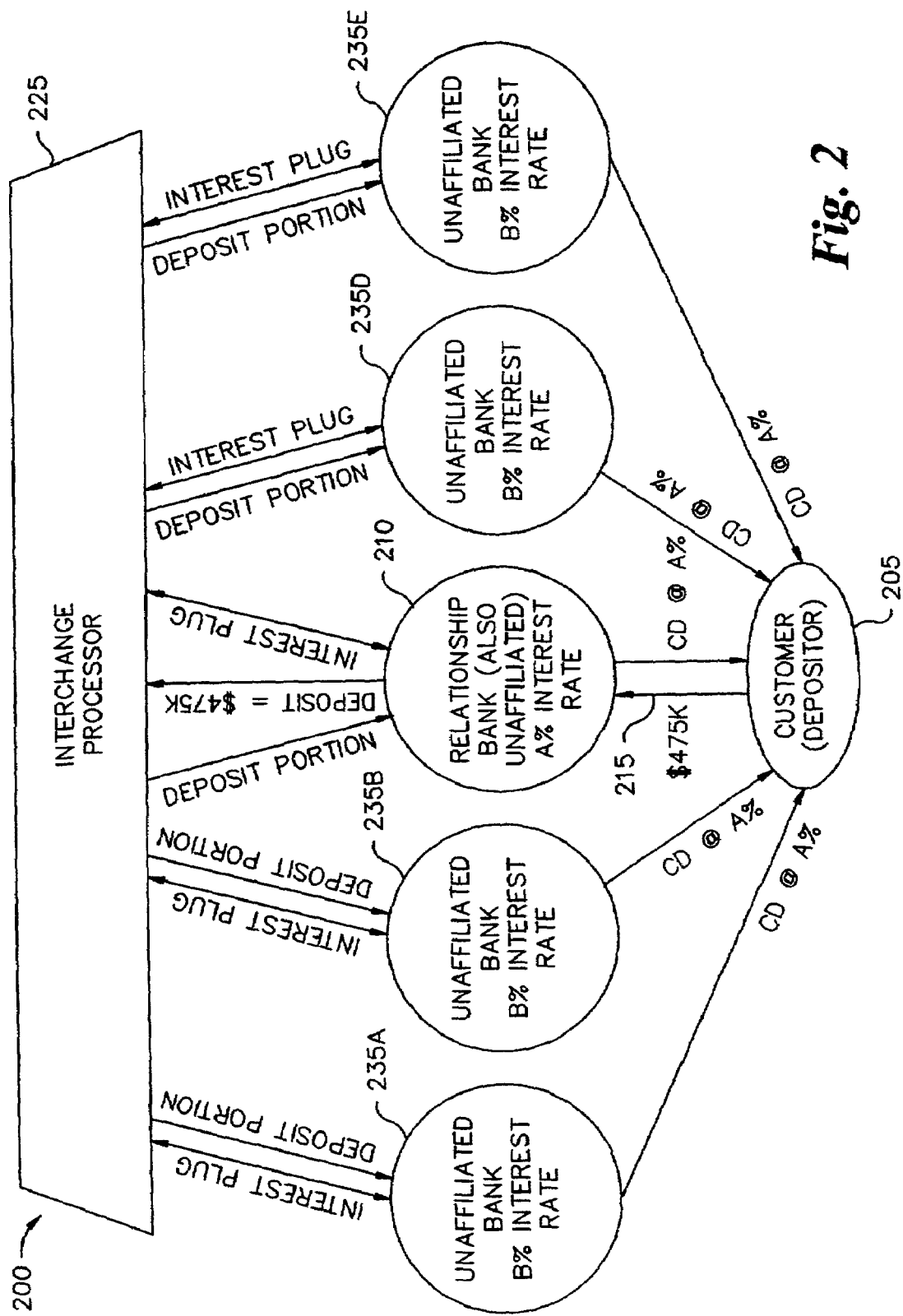
FIG. 2 is a block diagram showing how present value payments (PVPs) are used to compensate for differences in deposit terms offered by a plurality of different Unaffiliated Banks in accordance with the present invention.

FIG. 2 shows an example of equalizing deposit terms by transferring interest plug payments (a form of a present value payment) in an Interchange processor system 200 that includes a plurality of Unaffiliated Banks 235A, 235B, 235D, 235E and a Relationship Bank 210. For each trading period, each bank makes or receives interest plug payments to compensate for differences in deposit terms offered by each bank. For example, Relationship Bank 210 advertises a one-year CD at an interest rate of A %. The interest rate on the one-year CDs offered by each of the Unaffiliated Banks 235A, 235B, 235D, 235E is B %, and the established discount rate for purposes of calculating present value payments is 3.5%. An order is inputted into an Interchange 225 to process a large deposit for $475,000 placed by a customer (depositor) 205. The large deposit is partitioned by the Interchange 225 into five equal deposit portions, and one of the deposit portions is assigned to the Relationship Bank 210.

Since the Relationship Bank 210 has submitted $475,000 to Interchange 225, it is entitled (based on an agreement between the Relationship Bank 210 and the Interchange 225) to receive deposit portions totaling $475,000 associated with large deposits received by other Unaffiliated Banks. The Interchange takes the appropriate action to compensate for the occurrence of Deposit Mismatches.

In addition to transferring the $475,000 deposit through the Interchange, Relationship Bank 210 may have to transfer to the Interchange 225 an "interest plug" to ensure that the entire deposit order placed by Relationship Bank 210 on behalf of its customer 205 put both the Relationship Bank 210 and customer 205 in essentially the same position as if Relationship Bank 210 had maintained the entire deposit, with the deposit terms advertised by Relationship Bank 210. Accordingly, even though the deposit terms given on a one-year CD, for example, may vary among the Unaffiliated Banks 235A, 235B, 235D, 235E and Relationship Bank 210, use of an interest plug enables all of the Unaffiliated Banks to provide CDs to customer 205 with the same interest rate (A %) set by Relationship Bank 210 while not advantaging or disadvantaging any of the Unaffiliated Banks.

The value of the interest plug is a function of the present value of the difference between interest rate A % and interest rate B %. If, for example, the difference is positive whereby Relationship Bank 210 offers its customer 205 an interest rate A % that is in excess of the interest rate B % offered by each of the Unaffiliated Banks, then Relationship Bank 210 pays an interest plug to the Interchange 225 which assigns portions of the interest plug to Unaffiliated Banks 235A 235B, 235D, 235E, on a pro rata basis.

If the advertised interest rate A % of the Relationship Bank 210 is greater than the interest rate B % offered by each of the Unaffiliated Banks, an up-front interest plug is transferred from the Relationship Bank 210, via the Interchange 225, to the Unaffiliated Banks in addition to the $475,000 deposit. For example, if A % is 4% for a 52 week CD earning simple interest which is not paid until maturity, the established discount rate (C %) is 3.5% and B % is 3%, the up-front interest plug is calculated as follows:

Interest Plug=((Advertised Interest Rate−Unaffiliated Bank Interest Rate)×(large deposit−Relationship Bank tranche)×(maturity))÷(1+established discount rate) =(($A\%-B\%$)×($475,000−$95,000)× (1))÷(1+$C\%$) =((0.04−0.03)×($380,000)×(1))÷ (1+0.035)=$3671.50.

Accordingly, the Relationship Bank 210 transfers to the Interchange 225 an interest plug of approximately $3671, or approximately $918 for each deposit portion (tranche) transferred through the Interchange 225. Each of Unaffiliated Banks 235A, 235B, 235D, 235E receive an interest plug valued at $918. Thus, transferring interest plugs places the Relationship Bank 210 in essentially the same position as if it had simply accepted the entire deposit from customer 110 at its advertised rate, even though it has accepted deposits from the customers of the other Unaffiliated Banks and must pay a greater interest rate (B %) on those deposits. The system 200 allows all of the funds of the large deposit to be fully insured because system 200 assigns funds of the large deposit to a plurality of Unaffiliated Banks 235A, 235B, 235D, 235E, and Relationship Bank 210.

If the advertised interest rate A % of the Relationship Bank 210 is less than the interest rate B % of the Unaffiliated Bank, an up-front interest plug is charged to the Unaffiliated Banks 235A, 235B, 235D, 235E, and transferred, via the Interchange 225, to the Relationship Bank 210.

The Interchange 225 calculates present value payments to monetize the deposit terms offered by a plurality of different Unaffiliated Banks, such as interest rates and payout frequencies. In order to account for variations in the deposit terms offered by the Unaffiliated Banks, the Interchange 225 uses a calculation based on the deposit terms to determine the present value of interest payments paid to the customer.

FIG. 3 shows an example of performing a present value payment calculation that assumes that a deposit portion from one Unaffiliated Bank ("Bank A") is matched with a deposit portion from another Unaffiliated Bank ("Bank B"). In this example, interest is compounded monthly for Bank A and Bank B. Interest earned at Bank A is paid to the customer each time that the interest is compounded (i.e., the payout frequency is monthly). Interest earned at Bank B is not paid until maturity (i.e., the payout frequency is 1 year).

The present value of the cash flows (PVP) is calculated based on the following deposit terms, each of which may differ for each Unaffiliated Bank:

(1) the interest rates of Banks A and Bank B (both equaling 3.00% in this example);

(2) the amount of a deposit portion associated with a large deposit (in this example, $100,000 for Bank A and Bank B);

(3) a number of times n during a predetermined time period that interest earned on the deposit portion associated with the large deposit is to be compounded (in this example, n=12 for Bank A and Bank B), (4) a number of times t that the predetermined time period is to occur (in this example, t=1 for Bank A and Bank B);

(5) a corresponding period number that a particular interest payment is made;

(6) a payout frequency of the interest earned on the deposit portion (in this example, monthly for Bank A and at maturity for Bank B); and (7) an established discount rate r (in this example, r=3.00%), whereby the London Interbank Offering Rate (LIBOR) may be used as the established discount rate.

A first present value (PV) of cash flow is calculated using the first set of deposit terms, each time that interest earned on the deposit portion is compounded (in this example, n×t=12). A second present value (PV) of cash flow is also calculated using the second set of deposit terms, each time that interest earned on the deposit portion is compounded (in this example, n×t=12).

The sum of the individual present value of interest payments for each compounding period is equal to the present value (PV) of cash flow. The present values of interest payments are calculated as follows:

i=interest rate
r=discount rate
n=number of compounding periods before payment of interest
m=period in payout cycle (Note: if payout occurs in conjunction with compounding, e.g., monthly compounding and monthly interest payment, this value would always equal one)
d=large deposit
t=# of years CD is held
P=Interest payment per period, where:

$$P=d\times(1+i/(n\times t))^{(n\times t\times(m/n))}-d\times(1+i/(n\times t))^{(n\times t\times((m-1)/n))}$$

PV=Present Value, where:

$$PV=p/(1+r/(n\times t))^{(m/(n\times t))}$$

Based on the difference between the results of the first and second PV of cash flow calculations ($2,995.95 for Bank A and $3,037.47 for Bank B), the present value payment (PVP) is determined to be $41.52.

Based on the difference between the results of the first and second PV of cash flow calculations ($2,995.95 for Bank A and $3,037.47 for Bank B), the present value payment (PVP) is determined to be $41.52.

The Interchange enables each bank to continue setting its own deposit terms, which reflects the demand of the bank for funds and local market conditions. This mechanism ensures that low-cost funds passed through the Interchange benefit the Relationship Banks.

In one embodiment, the Interchange receives a fee from each bank for every transaction. In an embodiment, the fee is a specified number of basis points per dollar transferred through the Interchange. In another embodiment, the fee is lower for shorter term deposits (i.e., 4-week versus 52-week CDs).

In another embodiment, swaps only occur between deposits having the same maturity, such that (for example) a bank submitting 13-week money to the Interchange only receives 13-week money in exchange. Alternatively, Interchange services may be implemented that permit and facilitate the transfer of one maturity of deposit for another, or facilitate the transfer of non-maturity deposits. The Interchange may also implement uniform practices and procedures for handling early withdrawals.

Figure 4:
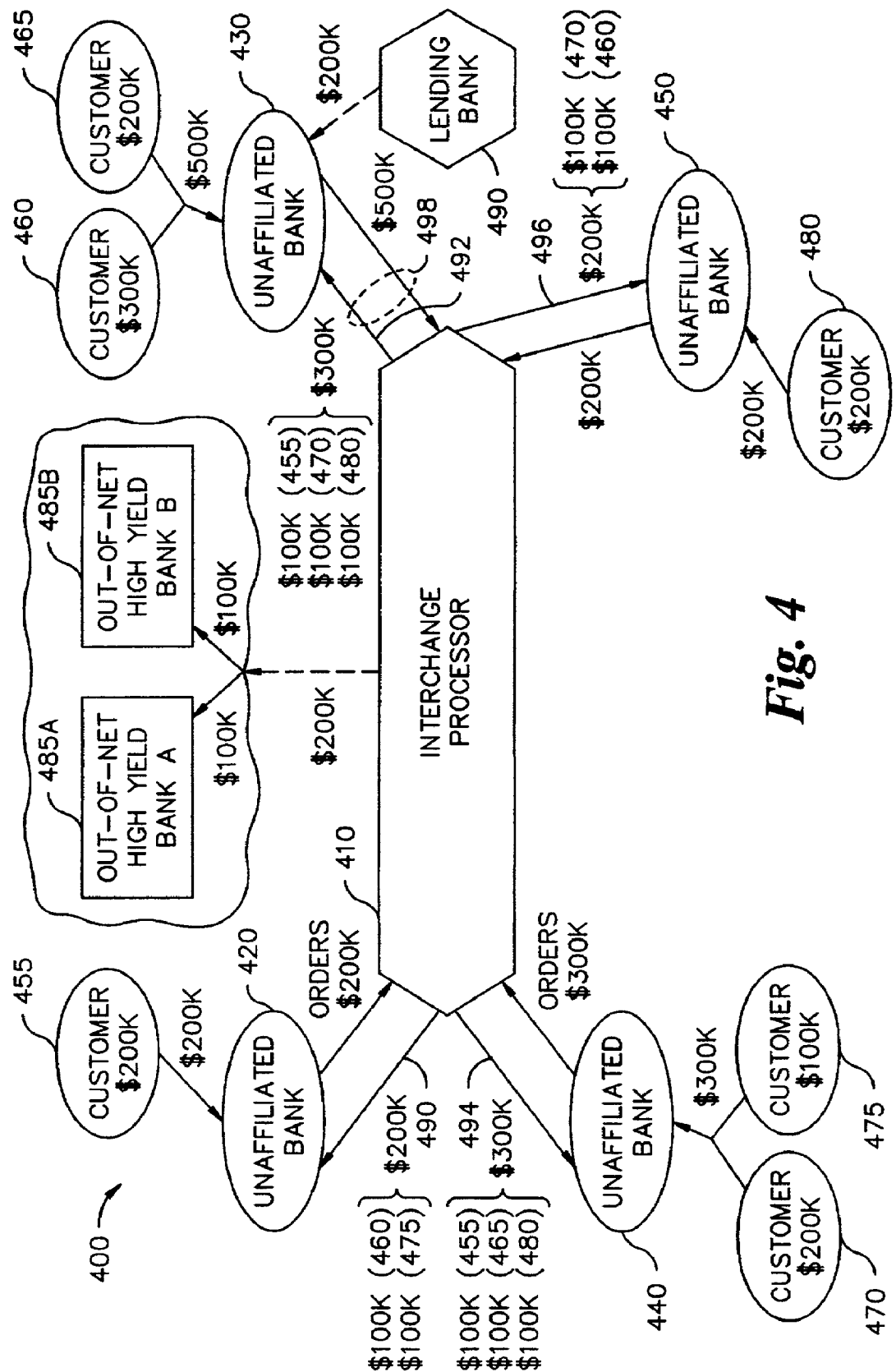
FIG. 4 is a block diagram showing how deposit mismatches among a plurality of Unaffiliated Banks are compensated for in accordance with the present invention.

FIG. 4 shows an example in an Interchange processor system 400 where a "mismatch" occurs and a plurality of Unaffiliated Banks 420, 430, 440, 450, are "made whole" through the addition of deposits from a Lending Bank. Under the assumption that all deposit terms offered by each of the Unaffiliated Banks 420, 430, 440, 450, are the same, no present value payments are transferred.

Unaffiliated Bank 420 receives a large deposit of $200,000 from customer 455. Unaffiliated Bank 420 inputs an order into Interchange 410 to process a $200,000 large deposit.

Unaffiliated Bank 430 receives a large deposit of $300,000 from customer 460, and a large deposit of $400,000 from customer 465. Unaffiliated Bank 430 inputs an order into Interchange 410 to process large deposits totaling $700,000.

Unaffiliated Bank 440 receives a large deposit of $200,000 from customer 470, and a large deposit of $100,000 from customer 475. Unaffiliated Bank 440 inputs an order into Interchange 410 to process large deposits totaling $300,000.

Unaffiliated Bank 450 receives a large deposit of $200,000 from customer 480. Unaffiliated Bank 450 inputs an order into Interchange 410 to process a $200,000 large deposit.

Unaffiliated Bank 420 receives from Interchange 410 via path 490, two deposit portions each valued at $100,000 and associated with large deposits placed by customers 460 and 475, respectively. Since Unaffiliated Bank 420 received a total value of deposit portions equivalent to the value of orders it inputted into Interchange 410, the Unaffiliated Bank 420 is "made whole."

Unaffiliated Bank 430 receives from Interchange 410 via path 492, three deposit portions each valued at $100,000 and associated with large deposits placed by customers 455, 470 and 480, respectively. Since Unaffiliated Bank 430 only received $300,000 of deposit portions and the value of orders it inputted into Interchange 410 was $500,000, a "mismatch" 498 occurs. Due to "mismatch" 498, the Unaffiliated Bank 430 is not "made whole" and thus an additional $200,000 of funds is deposited into Unaffiliated Bank 430 by Lending Bank 490.

Unaffiliated Bank 440 receives from Interchange 410 via path 494, three deposit portions each valued at $100,000 and associated with large deposits placed by customers 455, 465 and 480, respectively. Since Unaffiliated Bank 440 received a total value of deposit portions equivalent to the value of orders it inputted into Interchange 410, the Unaffiliated Bank 440 is "made whole."

Unaffiliated Bank 450 receives from Interchange 410 via path 496, two deposit portions each valued at $100,000 and associated with large deposits placed by customers 460 and 470, respectively. Since Unaffiliated Bank 450 received a total value of deposit portions equivalent to the value of orders it inputted into Interchange 410, the Unaffiliated Bank 450 is "made whole."

Interchange 410 directs the transfer of $200,000 to out-of-network high yield banks 485A and 485B because there is not enough capacity in system 400 to process all of the orders received from Unaffiliated Bank 430.

Figure 5:
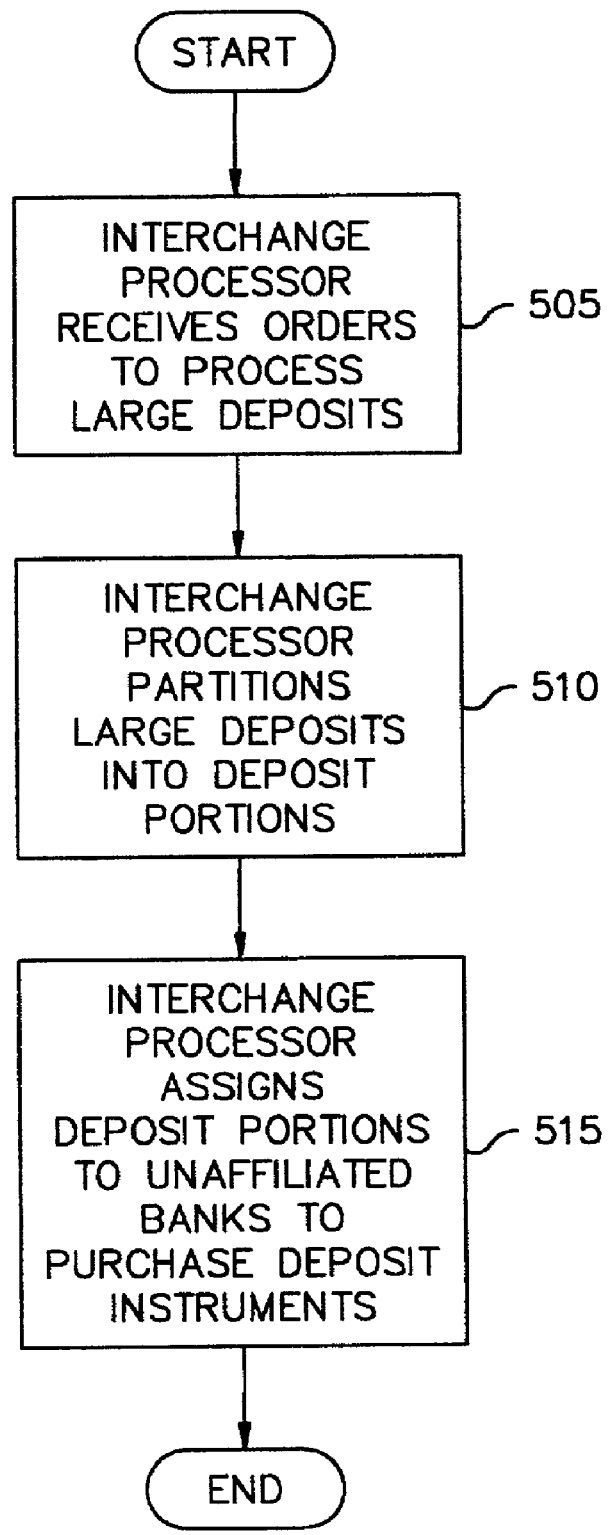
FIGS. 5, 6 and 7 are high-level functional flowcharts of processes used by an Interchange processor to process large deposits in accordance with the present invention.

FIGS. 4 and 5 show how large deposits that exceed an established deposit insurance limit (e.g., FDIC insurance limit of $100,000) are processed so that the large deposits are fully insured. The large deposits are received by a plurality of Unaffiliated Banks from their depositors. In step 505, an Interchange 410 receives orders placed by the plurality of Unaffiliated Banks 420, 430, 440, 450 to process the large deposits. In step 510, the Interchange 410 partitions each of the large deposits into a plurality of deposit portions. Each deposit portion does not exceed the established deposit insurance limit. In step 515, the Interchange 410 assigns at least some of the deposit portions to at least some of the Unaffiliated Banks 420, 430, 440, 450. Each specific deposit portion is used to purchase a deposit instrument (e.g., a certificate of deposit (CD)) from the Unaffiliated Bank 420, 430, 440, 450 that the specific deposit portion was assigned to.

As shown in FIG. 4, a first one of the Unaffiliated Banks 420 offers a first set of deposit terms to a depositor (customer 455) and a second one of the Unaffiliated Banks 430 offers a second set of deposit terms. The Interchange 410 receives an order placed by the first Unaffiliated Bank 420 to process a large deposit for $200,000 received from the depositor (customer 455). The Interchange 410 assigns, to the second Unaffiliated Bank 430, a deposit portion of $100,000 associated with the large deposit received from the depositor (customer 455). The Interchange 410 calculates the amount of a present value payment to be transferred between the first and second Unaffiliated Banks 420, 430 to compensate for differences between the first and second sets of deposit terms. As discussed in detail above, the Interchange 410 calculates a first PV of cash flow based on the first set of deposit terms. The Interchange 410 calculates a second PV of cash flow based on the second set of deposit terms. The Interchange 410 then calculates the difference between the results of the first and second PV of cash flow calculations to determine the present value payment (PVP).

For each specific Unaffiliated Bank 420, 430, 440, 450, the processor assigns the at least some of the deposit portions so as to minimize or eliminate the difference between the total amount of large deposits for which the specific Unaffiliated Bank 420, 430, 440, 450 placed orders into the Interchange 410 and the total amount of deposit portions assigned to the specific Unaffiliated Bank 420, 430, 440, 450 by the Interchange 410. The amount of each specific deposit portion is no greater than the established deposit insurance limit.

If the total amount of deposit portions assigned to the specific Unaffiliated Bank 420, 430, 440, 450 is less than the total amount of large deposits for which the specific Unaffiliated Bank 420, 430, 440, 450 placed orders into the Interchange 410, the Interchange 410 calculates an amount of additional funds to be deposited by the Lending Bank into the specific Unaffiliated Bank 420, 430, 440, 450 and directs the movement of such additional deposits to the specific Unaffiliated Bank 420, 430, 440, 450 so that the difference is minimized or eliminated.

Figure 6:
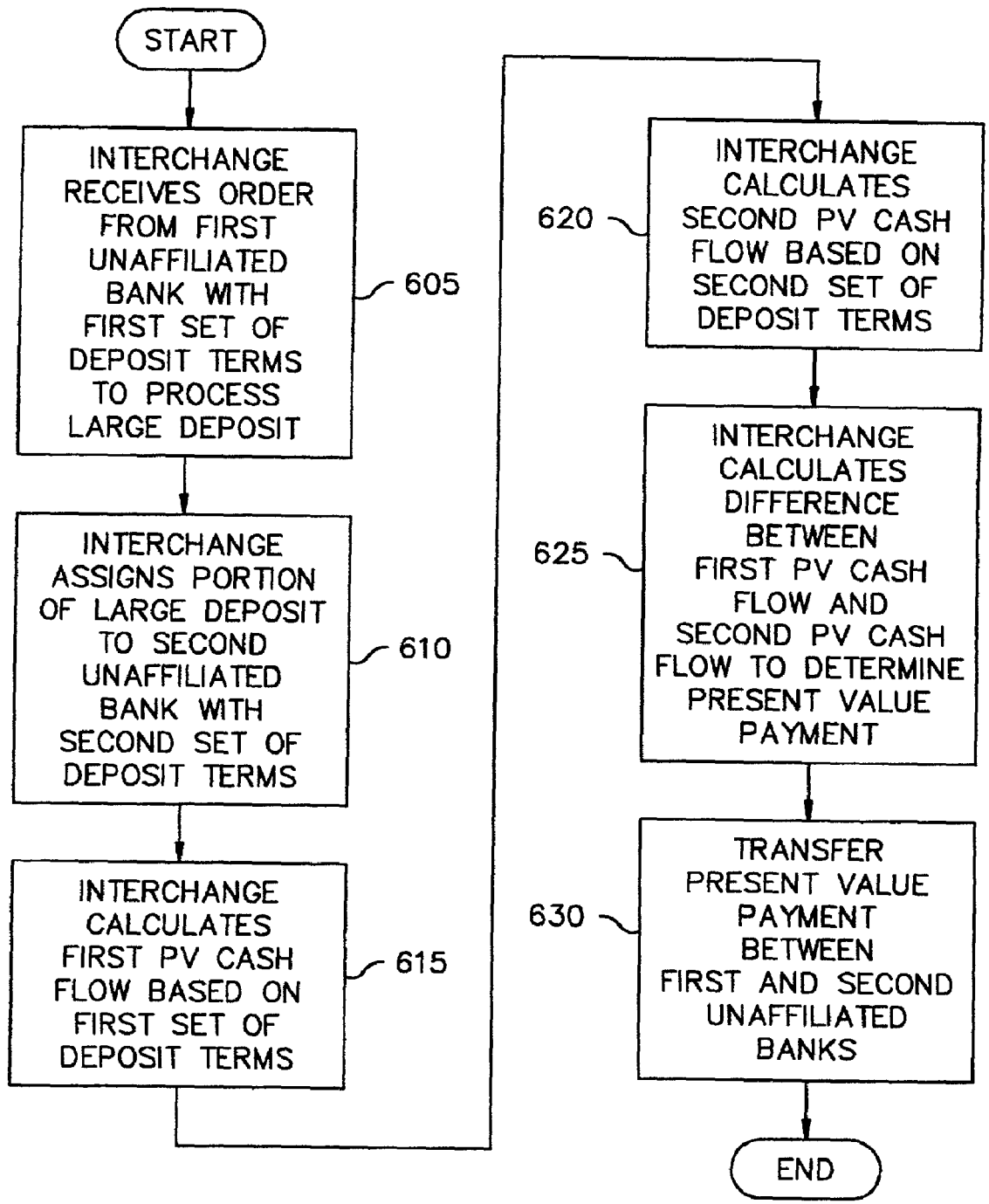

FIGS. 4 and 6 show how large deposits that exceed an established deposit insurance limit are processed so that the large deposits are fully insured. A first large deposit is received from a first depositor by a first one 420 of a plurality of Unaffiliated Banks 420, 430, 440, 450 that offers a first set of deposit terms to the first depositor. A second large deposit is received from a second depositor by a second one 430 of the plurality of Unaffiliated Banks 420, 430, 440, 450 that offers a second set of deposit terms to the second depositor. In step 605, the Interchange 410 receives an order placed by the first Unaffiliated Bank 420 (a Relationship Bank) to process the first large deposit. In step 610, the Interchange 410 assigns, to a second one 430 of the plurality of Unaffiliated Banks 420, 430, 440, 450, a portion of the large deposit that does not exceed the established deposit insurance limit. In step 615, the Interchange 410 calculates a first PV of cash flow based on the first set of deposit terms. In step 620, the Interchange 410 calculates a second PV of cash flow based on the second set of deposit terms. In step 625, the Interchange 410 calculates the difference between the results of the first and second PV of cash flow calculations to determine the present value payment (PVP). In step 630, the PVP is transferred between the first Unaffiliated Bank 420 and the second Unaffiliated Bank 430.

The Interchange may swap and allocate funds among a plurality of Unaffiliated Banks pursuant to one or more algorithms. The algorithm used for swapping and allocating funds is chosen with a goal of:

(1) Minimizing the total number of Deposit Mismatches/Deposit Placement Failures;

(2) Maximizing the percentage of Lending Bank deposits that are fully insured; and (3) Reducing net present value payments to banks as a whole.

For a given number of banks transferring a given amount of deposits of given sizes and given maturities through the Interchange, the algorithm generally selects, within each maturity, the largest deposit order and swaps the first tranche (in an amount up to the deposit insurance limit) with a similar sized tranche from a different Unaffiliated Bank that submitted to the Interchange the second largest deposit order, and then does the same with another Unaffiliated Bank holding the third largest deposit, and so on. Once the first, largest deposit has been fully allocated, or cannot be further placed, the Interchange places the second largest remaining deposit (as determined after subtracting any amount from a deposit that has been allocated to another bank) in a similar fashion. Use of this algorithm results in the Interchange allocating the largest deposits first. The remaining smaller deposits are easier to swap, whereby in some instances requiring only one or a few banks rather than the many needed to place a deposit order of, for example, $1 million.

In yet another embodiment, for a given number of banks, the algorithm selects, within each maturity, the largest deposit order and swaps the first tranche (in some amount up to the deposit insurance limit) with a similar sized tranche from a bank with the second largest deposit that earns the same or similar interest rate, and then does the same with the bank holding the third largest deposit and same or similar interest rate, and so on. In such an embodiment, a "similar" interest rate might be an interest rate within a specified range of the interest rate of the deposit order being allocated.

In yet another embodiment, the matching operation is conducted for products having a given maturity as follows. First, all the excess deposit funds from each Unaffiliated Bank are submitted to the Interchange and divided into tranches. Second, the average interest rate offered by each bank on the funds submitted to the Interchange is determined. In an embodiment, the interest rate so determined is a weighted average. Third, the average interest rate on the funds submitted to the Interchange by all the banks is determined. In one embodiment, this is a weighted average based on the funds submitted to the Interchange. Fourth, an ERate is selected based on the determinations in steps two and three above. In one embodiment, the ERate is the average value determined in step three. In yet another embodiment, the ERate is equal to the average value determined in step two that is closest to the average value determined in step three. Fifth, the Interchange determines an ordering for the banks based on the closeness of the interest rate of each bank to the ERate. Sixth, the largest deposit from the bank with an interest rate closest to the ERate is allocated through the Interchange. The tranches that make up this deposit are swapped with tranches from customers at banks whose interest rates are the furthest from the ERate. For example, the first tranche can be swapped with a tranche from a deposit in a bank whose interest rate is the highest above the ERate, and the second tranche can be swapped with a tranche from a deposit in a bank whose interest rate is the lowest below the ERate, and so on. Seventh, the second largest deposit from the bank is allocated through the Interchange, and so on.

Other embodiments employ similar algorithms, except that these algorithms match tranches first with tranches from banks whose interest rates are closest to the ERate. Matching in this manner tends to reduce the amount of interest plug payments that must be made through the Interchange.

Other possible algorithms for the matching operation are apparent to those skilled in the art. In some matching operations, a standard tranche size is determined and used, and equal-sized tranches are swapped between Unaffiliated Banks. The standard tranche size is at or below the insurance limit, such that any deposit formed from a tranche, with interest (if any), is fully insured. In such embodiments, each excess deposit is divided into standard size tranches, and any remainder ("a remainder-tranche") may be dealt with by matching it with other, like-sized remainder-tranches, or as an unmatched deposit pursuant to a mismatch resolution procedure. A goal may be to maximize the size of the individual tranches, as well as minimizing the total number of tranches.

The choice of which algorithms to use for the matching operation and/or for determining tranche size may depend on the particular assignment profile of the excess deposits submitted to the Interchange for allocation. The matching operation may require one-to-one swaps where a tranche from one bank is swapped with a like-sized tranche from another bank. In other embodiments, one-to-one swaps are not necessary. For example, a first customer from a first bank receives a CD from a second bank, a second customer from the second bank receives a CD from a third bank, and a third customer from the third bank receives a CD from the first bank. In this example, each bank has contributed a tranche to the Interchange, and each bank has issued a CD to the customer of another bank.

The customer is responsible for ensuring that he or she is fully covered by deposit insurance in all deposits (as is currently the case with all other bank accounts) but the Interchange attempts to ensure that the deposits transferred through the Interchange are fully insured. Each customer may be required or requested to identify, at the time he or she places a deposit, information to the Interchange regarding all banks in which the customer holds accounts. Each receiving Unaffiliated Bank is required to confirm that, to its knowledge, it does not already have deposits from a particular customer. In situations where the initial run of the algorithm places a deposit in a bank where a particular customer has already insured deposits, the Interchange reallocates such new deposit to another bank.

At the initial implementation of the invention in a given market, the Interchange may initiate the matching algorithm only one day per week (the matching date). In a vigorous market, more frequent, and ultimately, continuous daily matching may take place.

The Interchange can reserve the right to limit the size and number of deposits that may be contributed by any one institution for a given matching date. This measure can be implemented to prevent one large deposit or a large number of deposits from one Unaffiliated Bank from potentially overwhelming the Interchange during the startup period by directly or indirectly causing a large number of mismatches. Because the number of mismatches on a given matching date is a function of the number of Unaffiliated Banks participating in the Interchange on that date as well as the disparity in the size and number of the deposits that the Unaffiliated Banks pass through the Interchange, placing limitations on the size and number of deposits can serve to minimize the number of mismatches.

Municipal deposits (a deposit of a state or local governmental entity) can receive special treatment using the Interchange. For example, in the United States many states and Municipalities require as a matter of local or state law or as a matter of preference or practice that their deposits be placed with financial institutions located in or doing business within the state or Municipality. Accordingly, the Interchange can direct such Municipal deposits to banks within the state or community where they originated, either based on a preference specified by the customer, and/or automatically in accordance with applicable law. When the local market might be very small, the Interchange may reserve the right to reject or limit certain Municipal deposits until such time as it is able to find local matches.

In the case of very large deposits, the Interchange utilizes one of several possible mechanisms to ensure that all the interest earned on such deposits remains fully covered by deposit insurance (for example, by allocating interest payments in deposits among approved banks that did not receive portions of the original deposit (i.e., principal)).

The present invention can further encompass various means for handling deposit mismatches. Deposit mismatches (or "unmatched deposits") can occur when an Unaffiliated Bank transfers deposits through the Interchange and there are not enough other banks with which the Interchange can swap funds. This is most likely to occur when a bank transfers through the Interchange a large sum, whether from one or many customers.

Mismatches are minimized by balancing the maximum size of the deposits accepted with the number of Unaffiliated Banks and the frequency of the matching dates. In spite of such measures, mismatches can be expected to occur.

The Interchange can handle deposit mismatches through the use of a Lending Bank when the Interchange cannot assign all of the funds of a large deposit received from a customer of a Relationship Bank (e.g., because there are not enough qualified Unaffiliated Banks available). The Interchange can sell portions of any unallocated large deposits to the highest bidding banks ("highest bidders"). The Interchange also can establish agreements with certain banks to routinely sell them funds at a specified rate that is indexed, for example, to LIBOR or other rates.

To ensure full deposit insurance coverage, a portion (e.g., $100,000) of a $1 million large deposit that was mismatched in its entirety is placed with a single highest bidder (in an amount that is no more than the established deposit insurance limit). The highest bidder is required to assume responsibility for issuing a CD to the customer who deposited the large deposit at the Relationship Bank, as well as paying or receiving interest through the Interchange as an upfront present value payment, or, alternatively, as a flow of funds over time. The remaining portions of the $1 million mismatch are similarly placed with other highest bidding banks.

In order to return to the Relationship Bank the same amount of deposits that the Relationship Bank placed into the Interchange system, the Interchange arranges for a Lending Bank to deposit $1 million into the Relationship Bank in exchange for a CD at the same deposit terms that were given to the customer of the $1 million deposit. From the perspective of the Interchange, the $1 million deposit is considered a loan to the entire Interchange system in order to maintain liquidity. The cost of funds to the Lending Bank may be at or close to an established rate (e.g., LIBOR).

In return for the funds from the Lending Bank, the Relationship Bank issues a CD at the same deposit terms it offered to the $1 million depositor. Since the deposit from the Lending Bank exceeds $100,000 (or the Relationship Bank already holds funds from the Lending Bank), the Interchange, on behalf of the Relationship Bank, treats the Lending Bank deposit as any other large customer deposit and submits the funds received from the Lending Bank back through the Interchange matching engine.

The Interchange assigns the funds to other Unaffiliated Banks, each of which, in turn, issues a CD to the Lending Bank in an amount that does not exceed $100,000. Thus, the Relationship Bank effectively transfers funds at two different times to the Interchange (although it pays only one transaction charge and the second transfer would be done automatically by the Interchange without the Relationship Bank necessarily taking any action on it), once with the funds of the original depositor and second with the funds of the Lending Bank deposit. Unmatched funds are replaced by the deposit from the Lending Bank. The Relationship Bank replaces the funds with customer deposits from other Unaffiliated Banks. The same methodology can be used to handle mismatches from a variety of different banks, where banks offer a variety of deposit terms. Under such circumstances, differences in deposit terms can be compensated for by interest plugs or other means described herein.

The costs of the mismatch transaction may be borne by the Lending Bank while the revenues are accumulated by the Interchange. The Lending Bank and the Interchange may have an understanding or a contract that governs how to split the total return. The cost of the mismatch transaction could, for example, be the cost of funds for the Lending Bank, presumably at a rate at or near LIBOR. The revenues resulting from the mismatch transaction arise from the rates paid for funds by the highest bidders. The net revenues from mismatch transactions is the difference between the interest rate paid by the highest bidders and the cost of funds for the Lending Bank.

The Interchange can also facilitate the secondary market sale of CDs by customers. Although as a result of operation of the Interchange a customer may hold a plurality of CDs in a plurality of banks, the customer can still use the Relationship Bank to sell some or all of the CDs on a secondary market prior to their maturity. For example, a customer holds $1,000,000 in CDs that it obtained through a Relationship Bank, e.g. ten CDs of $100,000 issued by ten different banks. For the purposes of this example, it is assumed either that the interest does not accumulate in the account holding the deposit, or that the insurance limit is in excess of $100,000. The customer instructs the Relationship Bank to sell $200,000 of the CDs. The Relationship Bank takes the order (for which it may charge a service fee), and conveys the sales order to a preferred broker to sell two of the $100,000 CDs. The preferred broker matches the customer to one or more buyers and consummates the sale. The preferred broker may maintain a secondary market in such CDs so as to facilitate transactions. If so, and when necessary, the preferred broker may purchase the CDs itself, selling them to a highest bidder at a later date.

The preferred broker notifies the Interchange, which, as the agent for the Relationship Bank (and indirectly for the customer), transfers the ownership of $200,000 in CDs to the buyer(s). A Service Bureau may make the appropriate changes to the books and records. The preferred broker becomes the agent of the buyer(s), with the Interchange as the agent of preferred broker.

The Relationship Bank may collect a service fee. The preferred broker may receive a commission. The Interchange may receive a transaction fee (which may be dependent on the size of the commission/spread of the preferred broker).

In accordance with the present invention, the Interchange is an order matching engine that executes an order matching process. The order matching process utilizes a sophisticated algorithm that automatically matches orders based on a predefined set of rules. This ensures an order matching and execution utility that optimizes three different variables:

(1) Minimize the total number of mismatches;
(2) Maximize the percentage of Lending Bank deposits that are fully insured; and
(3) Minimize net present value payments to banks as a whole.

Initially, the order matching engine is scheduled to execute one or two times per week. As more Unaffiliated Banks obtain membership to the Interchange and transaction volumes increase in the system, the matching schedule becomes more frequent, whereby the order match engine could ultimately match orders many times on every business day. The order matching engine executes each type of deposit instrument separately. The type of deposit instruments that are expected to be supported by the Interchange include (but are by no means limited to):

(1) 1-week CD;
(2) 4-week CD;
(3) 13-week CD;
(4) 26-week CD;
(5) 52-week CD; and
(6) Municipality CDs (with the same maturities as listed above).

The Order Matching process involves the following steps:
(1) Pre-Processing;
(2) Adjusting the Optimization Scenario;
(3) Executing the Matching rules;
(4) Customer Validation;
(5) Resolution of Mismatches through Lending Bank deposits; and
(6) Finalize Matches.

The order matching and execution utility seeks to optimize three different variables:

(1) Minimizing the total number of mismatches reduces the amount of deposits that are needed from the Lending Bank, which the Unaffiliated Banks accept to make their transactions whole. By reducing mismatches, the Interchange minimizes its costs and simplifies its record keeping. The Interchange is able to minimize mismatches by:

(a) Matching larger deposits first. Larger deposits need to be placed at the largest number of banks and therefore they are matched first. By doing so, the Interchange is able to maximize liquidity.

(b) Setting bank and customer deposit maximums. By instituting limits on the amount of money each bank overall and individual bank customer can place in the Interchange, the Interchange can manage the available liquidity in the system.

(c) Using a periodic matching cycle. As the business grows, the Interchange adjusts the length of time between matching executions. Initially, the Interchange may potentially match less than daily (e.g., once or twice a week) in order to increase the number of orders in the system, thereby decreasing the number of mismatches. In such instances, banks and their customers are informed of the match date and no funds are ordered moved until that date.

(2) Minimize net present value payments. The matching of CDs through the Interchange is achieved through a mathematical algorithm that matches deposits with banks whose interest rates are generally closest in value. This minimizes the net amount of present value payments (PVPs) that are made to each Unaffiliated Bank.

(3) Maximize the percentage of the Lending Bank deposits that are fully insured. In order to minimize costs to the Interchange and risk to the Lending Bank, the Interchange attempts to maximize the amount of any Lending Bank deposits used to cover mismatches that are fully insured. When a mismatch occurs, the Lending Bank provides a deposit to the Unaffiliated Bank. In return for the funds from the Lending Bank, the Unaffiliated Bank issues a CD for the full amount. If the amount exceeds the FDIC insurance maximum or the Unaffiliated Bank already holds funds from the Lending Bank, the Interchange on behalf of the Unaffiliated Bank, may treat the deposit essentially as any other large customer deposit and resubmit the funds through the order matching engine. Through the facilitation of the optimization tool, the Interchange controls the assignment of funds with other Unaffiliated Banks and tries to ensure that the Lending Bank receives FDIC insured CDs equal in value to the deposit it made in order to eliminate deposit mismatches. This process may cause more than one matching cycle to be executed. The Interchange can swap and match these funds in two ways:

(a) Execute the order matching algorithm twice: In the first run, the algorithm performs an analysis in order to determine how many Unaffiliated Banks are available to provide CDs to the Lending Bank. In the second run, the algorithm inserts orders from the Lending Bank that are "matched" along with the rest of the orders entered during the matching cycle.

(b) Manual process: After the initial order match algorithm has been run, the Interchange brokers may manually reallocate deposits among the banks so as to provide greater insured coverage to the Lending Bank.

Figure 7:
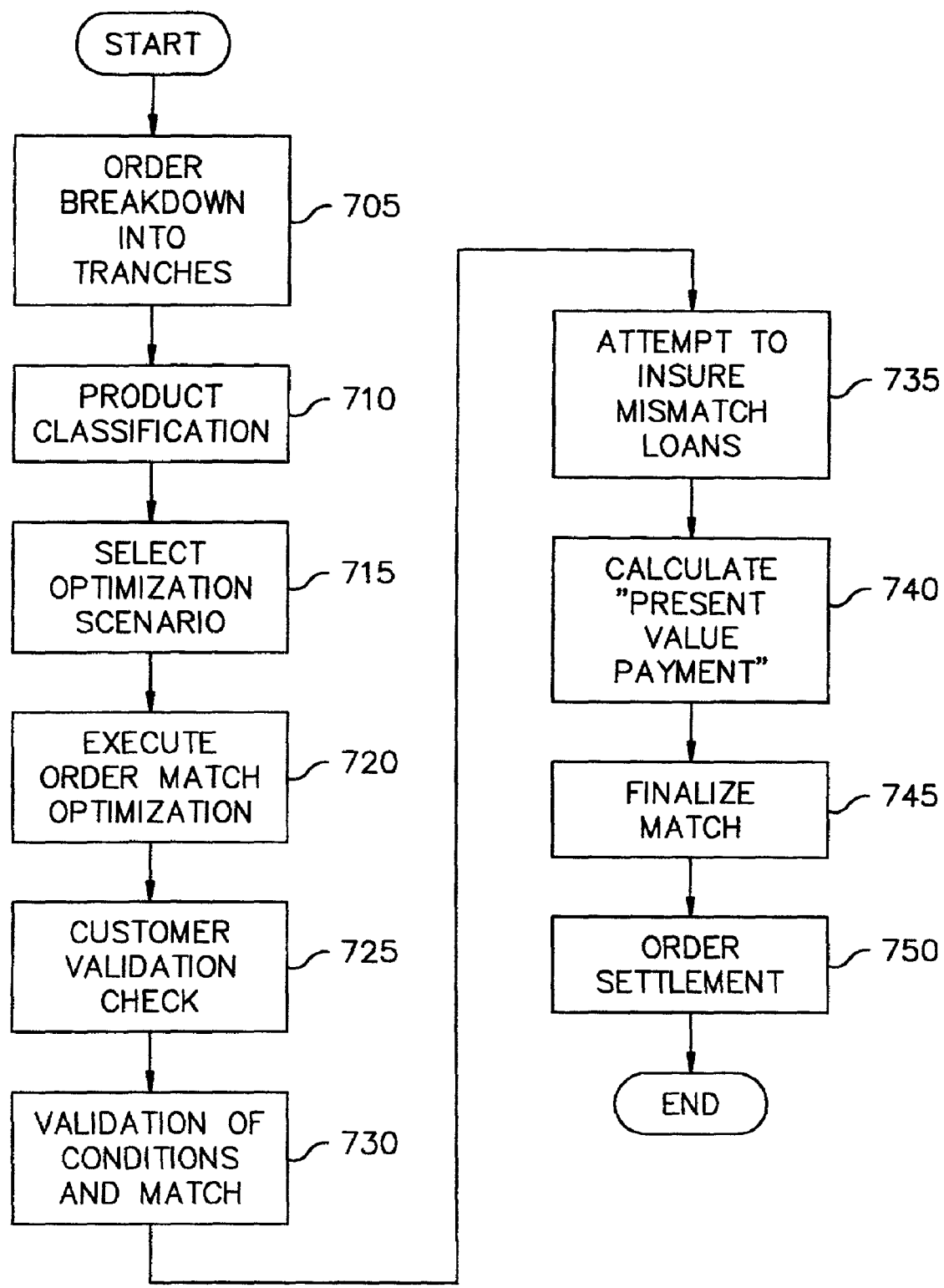

FIG. 7 shows a flowchart including method steps implemented by the present invention. In step 705, an algorithm is executed to break-down customer deposit orders into insured deposit portions (tranches). Daily within each group, a maximum tranche size is calculated for each product group. Standard tranche sizes are designated based on the deposit terms. The tranche size is set such that the total deposit amount does not exceed the FDIC deposit insurance limit during the term of the product, even if interest is compounded and held to maturity. All tranches are less than or equal to the calculated tranche size for that specific product group. Actual tranche sizes are determined daily during the execution of the matching rules and take into account at least one rollover period. If an order to process a large deposit is smaller than a system defined minimum tranche size, the order is processed as an exception. Orders are stored in tranches in an Order-Repository. The matching engine is run for each product term separately.

Throughout the day, Unaffiliated Banks submit orders to the Interchange where they are stored in an Order-Repository until the order matching optimization is executed. Prior to the matching and filling of Interchange orders, processing occurs to organize and categorize the orders placed by individual banks. This optimizes the order matching process.

In step 710, orders are organized/categorized into the following groups:

(1) Product Type: Certificate of Deposits and Municipal Certificate of Deposits.

(2) Product Terms: 1 week, 4 weeks, 13 weeks, 26 weeks, 52 weeks, or the like.

In step 715, an optimization scenario is selected and, in step 720, the order match optimization is executed so as to optimize in some form the following three variables:

(1) Minimize the total number of Deposit Mismatches/Deposit Placement Failures;

(2) Maximize the percentage of Lending Bank deposits that are fully insured; and (3) Reduce net present value payments to banks as a whole.

The Interchange may prioritize these variables differently based on the make-up of orders in the system and the configuration of banks placing orders in the matching period. For example, if most Lending Bank deposits could be fully insured, then the Interchange may want to place more emphasis on minimizing present value payments rather than on minimizing the number of mismatches.

Depending on how the optimization scenario is adjusted to prioritize the three variables, orders are matched based on:

(1) Product type (Municipal CDs generally must be matched first because of the additional geographical restrictions on their placement);

(2) Deposit amount (larger deposits are generally matched first to minimize Deposit Mismatches/Deposit Placement Failures);

(3) Interest Rate (orders with interest rates closest to the order being matched are matched to minimize present value payments);

(4) Credit-worthiness of bank (orders from least creditworthy institutions are matched first to reduce the likelihood that a mismatch will occur at such institutions which will, in turn, minimize risk to the Interchange and Lending Bank); and (5) The ability of an Unaffiliated Bank to offer Lending Bank a fully FDIC insured CD (banks who have already issued CDs to the Lending Bank may be matched first to maximize the number of fully insured Lending Bank deposits).

The Interchange attempts not to place deposits in a bank where a customer already has deposits. In addition to utilizing a customer validation process, the Interchange places a preference on matching orders with banks that belong to different geographical territories. Unaffiliated Banks are grouped by geographic territories. Each state is grouped into a geographic region of the United States. Logic is included to select an order from:

(1) a different state within the geographic region of an order;

(2) a different geographic region than the state that the order originated from;

(3) a different county within the same state; and (4) a same state as the selected order (often necessary for Municipal CDs).

Before matches can be finalized, matches must be validated to ensure that no predefined condition sets have been violated. All conditions must be satisfied before an order can be successfully matched. Listed below are condition sets identified by the Interchange that restrict orders from matching with each other:

(1) Banking Laws and Regulations (e.g., deposits of a Municipality often need to be matched with banks in a specific geographic region, state, or county within a state);

(2) Customer Preferences (e.g., banks where the customer does not want their deposits placed); and (3) Unaffiliated Bank preferences (e.g., direct competitors where Unaffiliated Banks do not want their customer deposits placed).

In order for deposits of a customer to be fully insured, the customer cannot exceed the FDIC deposit insurance limit at any given bank within certain account types as stipulated by the FDIC.

In step 725, since a customer may not have informed the Interchange of existing deposits at other banks, the Interchange institutes a customer validation process to validate that the Interchange has not placed a Multi-CD at an Unaffiliated Bank where the customer already has an existing deposit. This customer validation process occurs after the initial, preliminary run of the order match optimization utility has been executed. The following steps are included in the process:

(1) For each Unaffiliated Bank to receive deposits, the Interchange application compiles lists of taxpayer identification numbers for those depositors whose deposits are likely to be placed at the Unaffiliated Bank;

(2) Interchange application identifies other matches that may be swapped if a customer validation fails and adds these taxpayer IDs to the original list;

(3) The Interchange sends the list of taxpayer IDs to the particular Unaffiliated Bank where they were tentatively matched;

(4) The Unaffiliated Bank accepts or rejects each taxpayer ID—rejecting a specific taxpayer ID if it already holds deposits from the depositor with the specific taxpayer ID; and (5) If a customer validation fails, the Interchange application updates the customer conditions so that future orders from the customer are not placed at the same bank. The failed order and its match are swapped with one of the orders identified in step (2).

In step 730, the order optimization utility performs the following validation checks:

(1) Customers may inform the Interchange (through their Relationship Bank) of other Unaffiliated Banks where they have deposits. The order match optimization utility does not place deposits of customers at these banks.

(2) The Interchange records at which Unaffiliated Banks the Interchange has placed the deposits of the customers. The order match optimization utility queries these records to verify that any further deposits of customers are not placed at these banks.

In step 735, the Interchange resolves Deposit Placement Failures by selling "unplaced" deposits, in increments less than the FDIC deposit insurance limit, to banks that participate in the high yield deposit market, collecting the highest rates. The Interchange requests the Lending Bank to deposit an amount equal to the Deposit Mismatches into the underfunded banks so that all banks (except the above-mentioned purchases of "unplaced" deposits) received funds equal to what they contributed to the Interchange. In return for the Lending Bank deposits, the Unaffiliated Banks issue CDs for the full amount of their respective Lending Bank deposits. However, if any such amount exceeds the FDIC deposit insurance limit or the Unaffiliated Bank already holds funds from the Lending Bank, the Unaffiliated Bank re-submits the funds to the Interchange where an attempt will be made re-match the funds. Through the facilitation of the optimization tool, the Interchange controls the assignment of the funds with other Unaffiliated Banks and attempts to ensure that the Lending Bank receives FDIC insured CDs equal in value to any deposits it has made. The order match optimization considers the ability of each bank to provide the Lending Bank a CD during the matching process. The optimization algorithm determines how many banks and matches are required to insure the greatest percentage of Lending Bank deposits. The optimization algorithm selects its matches based on this and other criteria.

Once orders have been matched and validated, and any Lending Bank deposits made and secured, the order and match details (e.g., order numbers, deposit amounts, interest rates, bank ID, placement details, taxpayer IDs) are sent to a Service Bureau for processing. At this point, the orders are considered final.

In step 740, present value payments are calculated and transferred, and banks are notified of the match results. The Interchange Broker monitors incoming orders and is given the data and tools necessary to finalize the matching process (step 745) by performing the following tasks:

(1) Manually match orders;

(2) Change the matches created by the order match optimization algorithm. For example, the Interchange Broker may decide to swap matches in order to reduce the number of Lending Bank deposits placed at any single bank; and (3) Monitor the potential number of mismatches if the order match optimization algorithm were to be executed.

In step 750, orders are settled, record-keeping is updated and customer confirmation is implemented.

While several of the aforementioned examples refer to United States dollars and the United States Federal Deposit Insurance Corporation (FDIC) $100,000 insurance limit, with appropriate substitutions these examples may be used to illustrate the implementation of the invention in systems using currencies other than dollars, with different insurance limits and with different institutions.

Furthermore, although certificate of deposits (CDs) have been disclosed as being used as deposit instruments, certain investment retirement accounts (IRAs) may also be used as deposit instruments.

The present invention may be implemented with any combination of hardware and software. If implemented as a computer-implemented apparatus, the present invention is implemented using means for performing all of the steps and functions described above.

The present invention may be implemented with any combination of hardware and software. The present invention can be included in an article of manufacture (e.g., one or more computer program products) having, for instance, computer useable media. The media has embodied therein, for instance, computer readable program code means for providing and facilitating the mechanisms of the present invention. The article of manufacture can be included as part of a computer system or sold separately.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention.

What is claimed is:

1. A computer-implemented method of processing large deposits that exceed an established deposit insurance limit so that the large deposits are fully insured, the large deposits being received by a plurality of unaffiliated banks from their depositors, the method comprising:

(a) a processor receiving orders placed by the plurality of unaffiliated banks to process the large deposits;

(b) the processor partitioning each of the large deposits into a plurality of deposit portions, each deposit portion not exceeding the established deposit insurance limit; and (c) the processor assigning at least some of the deposit portions to at least some of the unaffiliated banks, wherein each specific deposit portion is used to purchase a deposit instrument from the unaffiliated bank that the specific deposit portion was assigned to, wherein a first one of the unaffiliated banks offers a first set of deposit terms to a first depositor and a second one of the unaffiliated banks offers a second set of deposit terms to a second depositor, the method further comprising:

(d) the processor receiving an order placed by the first unaffiliated bank to process a large deposit received from the first depositor;

(e) the processor assigning, to the second unaffiliated bank, a deposit portion associated with the large deposit received from the first depositor; and (f) the processor calculating the amount of a present value payment to be transferred between the first and second unaffiliated banks to compensate for differences between the first and second sets of deposit terms.

2. The method of claim 1 wherein step (f) further comprises:

(I) the processor calculating a first present value of cash flow based on the first set of deposit terms;

(II) the processor calculating a second present value of cash flow based on the second set of deposit terms; and (III) the processor calculating the difference between the first present value of cash flow and the second present value of cash flow, wherein the result of step (f)(III) is the present value payment.

3. The method of claim 2 wherein the first and second present values of cash flow are determined based on (i) interest rates offered by the first and second unaffiliated banks, (ii) the amount of the deposit portions associated with the large deposit, (iii) a number of times during a predetermined time period that interest earned on the deposit portions associated with the large deposit is to be compounded, (iv) a number of times that the predetermined time period is to occur, (v) a payout frequency of the interest earned on the deposit portions, and (vi) an established discount rate.

4. The method of claim 3 wherein the established discount rate is the London Interbank Offering Rate (LIBOR) or a derivative thereof.

5. The method of claim 1 wherein the amount of each specific deposit portion is substantially equivalent to the established deposit insurance limit, the method further comprising:
(g) the processor initiating the transfer of a payment to the depositor or to an account thereof each time that interest earned on the associated deposit portion is compounded, so that the amount of the specific deposit portion does not exceed the established insurance limit.

6. The method of claim 1 wherein for each specific unaffiliated bank, the processor assigns the at least some of the deposit portions so as to minimize or eliminate the difference between the total amount of large deposits for which the specific unaffiliated bank placed orders into the processor and the total amount of deposit portions assigned to the specific unaffiliated bank by the processor.

7. The method of claim 6 wherein if the total amount of deposit portions assigned to the specific unaffiliated bank is less than the total amount of large deposits for which the specific unaffiliated bank placed orders into the processor, the processor (i) calculates an amount of funds to be deposited by a Lending Bank into the specific unaffiliated bank, and (ii) directs the deposit of the funds to the specific unaffiliated bank so that the difference is minimized or eliminated.

8. The method of claim 1 wherein the deposit instrument is a certificate of deposit (CD).

9. The method of claim 8 wherein the CD is a Municipal CD.

10. The method of claim 1 wherein the processor prioritizes the orders in step (a) based on the ability of the unaffiliated banks to offer a fully insured deposit instrument in return for a deposit made by a Lending Bank.

11. The method of claim 1 wherein the processor prioritizes the orders in step (a) based on the credit rating of the unaffiliated banks.

12. The method of claim 1 wherein the processor prioritizes the orders in step (a) based on the type of deposit instruments purchased from the unaffiliated banks.

13. The method of claim 1 wherein the processor prioritizes the orders in step (a) based on the size of each of the large deposits.

14. The method of claim 1 wherein the processor prioritizes the orders in step (a) based on interest rates offered by the unaffiliated banks.

15. The method of claim 1 wherein the processor prioritizes the orders in step (a) based on the geographical location of the unaffiliated banks.

16. The method of claim 1 wherein the processor prioritizes the orders in step (a) based on preferences indicated by the depositors.

17. The method of claim 1 wherein the processor prioritizes the orders in step (a) based on preferences indicated by the unaffiliated banks.

18. The method of claim 1 wherein the established deposit insurance limit is in accordance with U.S. law, regulations and rules established by the United States Federal Deposit Insurance Corporation (FDIC).

19. The method of claim 1 wherein the established deposit insurance limit is in accordance with U.S. law, regulations and rules established by the National Credit Union Administration (NCUA).

20. The method of claim 1 wherein if there are not enough unaffiliated banks for the processor to assign all of the deposit portions to in such a manner that ensures that the deposit portions are all fully insured, the method further comprising:
(d) assigning the deposit portions to at least one other bank that did not place any or an equivalent amount of orders to process large deposits into the processor.

21. The method of claim 1 wherein steps (b) and (c) are executed by the processor on a periodic basis.

22. A computer-implemented method of processing a large deposit that exceeds an established deposit insurance limit so that the large deposit is fully insured, the large deposit being received from a depositor by a first one of a plurality of unaffiliated banks, the method comprising:
(a) a processor receiving an order placed by the first unaffiliated bank to process the large deposit, the first unaffiliated bank offering a first set of deposit terms to a first depositor;
(b) the processor assigning, to a second one of the plurality of unaffiliated banks, a portion of the large deposit not exceeding the established deposit insurance limit, the second unaffiliated bank offering a second set of deposit terms to a second depositor; and
(c) the processor calculating the amount of a present value payment to be transferred between the first unaffiliated bank and the second unaffiliated bank to compensate for differences between the first and second sets of deposit terms,
wherein step (c) further comprises:
(I) the processor calculating a first present value of cash flow based on the first set of deposit terms;
(II) the processor calculating a second present value of cash flow based on the second set of deposit terms; and
(III) the processor calculating the difference between the first present value of cash flow and the second present value of cash flow, wherein the result of step (c)(III) is the present value payment.

23. The method of claim 22 wherein the first and second present values of cash flow are determined based on (i) interest rates offered by the first and second unaffiliated banks, (ii) the amount of the deposit portions associated with the large deposit, (iii) a number of times during a predetermined time period that interest earned on the deposit portions associated with the large deposit is to be compounded, (iv) a number of times that the predetermined time period is to occur, (v) a payout frequency of the interest earned on the deposit portions, and (vi) an established discount rate.

24. The method of claim 23 wherein the established discount rate is the London Interbank Offering Rate (LIBOR) or a derivative thereof.

25. The method of claim 22 wherein the amount of the portion of the large deposit is substantially equivalent to the established deposit insurance limit, the method further comprising:
(d) transferring an interest payment to the depositor or to an account thereof each time that interest earned on the portion of the large deposit is compounded, so that the amount of the portion of the large deposit does not exceed the established insurance limit.

26. The method of claim 22 wherein the established deposit insurance limit is in accordance with U.S. law, regulations and rules established by the United States Federal Deposit Insurance Corporation (FDIC).

27. The method of claim 22 wherein the established deposit insurance limit is in accordance with U.S. law, regulations and rules established by the National Credit Union Administration (NCUA).

28. A computer-implemented method of processing large deposits that exceed an established deposit insurance limit so that the large deposits are fully insured, the large deposits being received by a plurality of banks from their depositors, the method comprising:
- (a) a processor receiving orders placed by the plurality of banks to process the large deposits;
- (b) the processor partitioning each of the large deposits into a plurality of deposit portions, each deposit portion not exceeding the established deposit insurance limit;
- (c) the processor assigning at least some of the deposit portions to at least some of the banks, wherein each specific deposit portion is used to purchase a deposit instrument from the bank that the specific deposit portion was assigned to;
- (d) the processor receiving an order placed by a first one of the banks that offers a first set of deposit terms to a first depositor;
- (e) the processor assigning, to a second one of the banks that offers a second set of deposit terms to a second depositor, a deposit portion associated with the large deposit received from the first depositor; and
- (f) the processor calculating the amount of a present value payment to be transferred between the first and second banks to compensate for differences between the first and second sets of deposit terms.

\* \* \* \* \*

UNITED STATES PATENT AND TRADEMARK OFFICE
CERTIFICATE OF CORRECTION

PATENT NO. : 7,440,914 B2  Page 1 of 1
APPLICATION NO. : 10/124462
DATED : October 21, 2008
INVENTOR(S) : Mark P. Jacobsen It is certified that error appears in the above-identified patent and that said Letters Patent is hereby corrected as shown below:

Title page, Item (56):

Under "Other Publications", the following reference should be listed:

-- PCT International Search Report for PCT/US02/23518, mailed May 27, 2003, 5 pages --.

Signed and Sealed this

Twenty-fourth Day of March, 2009

JOHN DOLL
*Acting Director of the United States Patent and Trademark Office*